United States Patent [19]

Fevold et al.

[11] Patent Number: 5,115,596
[45] Date of Patent: May 26, 1992

[54] SLIDING DOOR MOUNTING SYSTEM

[75] Inventors: Braden N. Fevold, Roseau; Timothy W. Stoll, Salol; Leslie B. Hendrickson, Roseau, all of Minn.

[73] Assignee: Marvin Lumber and Cedar Co. d/b/a Marvin Windows, Warroad, Minn.

[21] Appl. No.: 642,350

[22] Filed: Jan. 17, 1991

[51] Int. Cl.⁵ .......................................... E05D 15/06
[52] U.S. Cl. ...................................... 49/411; 49/425; 16/105
[58] Field of Search .................. 49/411, 410, 409, 425, 49/427; 16/105

[56] References Cited

U.S. PATENT DOCUMENTS

| | | | |
|---|---|---|---|
| 3,339,223 | 9/1967 | Laby | 16/105 |
| 3,425,162 | 2/1969 | Halpern | 49/425 |
| 4,073,092 | 2/1978 | Williams | 49/409 X |
| 4,134,233 | 1/1979 | Gutridge et al. | 49/411 |
| 4,176,497 | 12/1979 | Nagy | 49/411 |
| 4,887,394 | 12/1989 | Marlowe | 16/105 X |

Primary Examiner—Philip C. Kannan
Attorney, Agent, or Firm—Lawrence M. Nawrocki

[57] ABSTRACT

Apparatus for mounting a sliding door for horizontal movement in a frame which has an upwardly-extending upper track and an upwardly-extending lower track which comprises a horizontally-elongated rib defining a generally vertically-oriented plane. The apparatus includes a sliding door panel which includes upper and lower generally horizontal rail members. Means are provided to mount the sliding door panel to the upper track for horizontal movement along the track. The apparatus also includes an extruded elongated element suspended from the lower generally-horizontal rail member of the sliding door panel. The elongated element is disposed for free reciprocating vertical movement relative to the lower generally-horizontal rail member. The elongated element is provided with a length substantially the full length of the sliding door panel. The element is also provided with a slot which is formed in a bottom surface of the element. The slot extends substantially the full length of the bottom surface of the elongated element, the slot receiving the horizontally-elongated rib defined by the lower track therein.

6 Claims, 2 Drawing Sheets

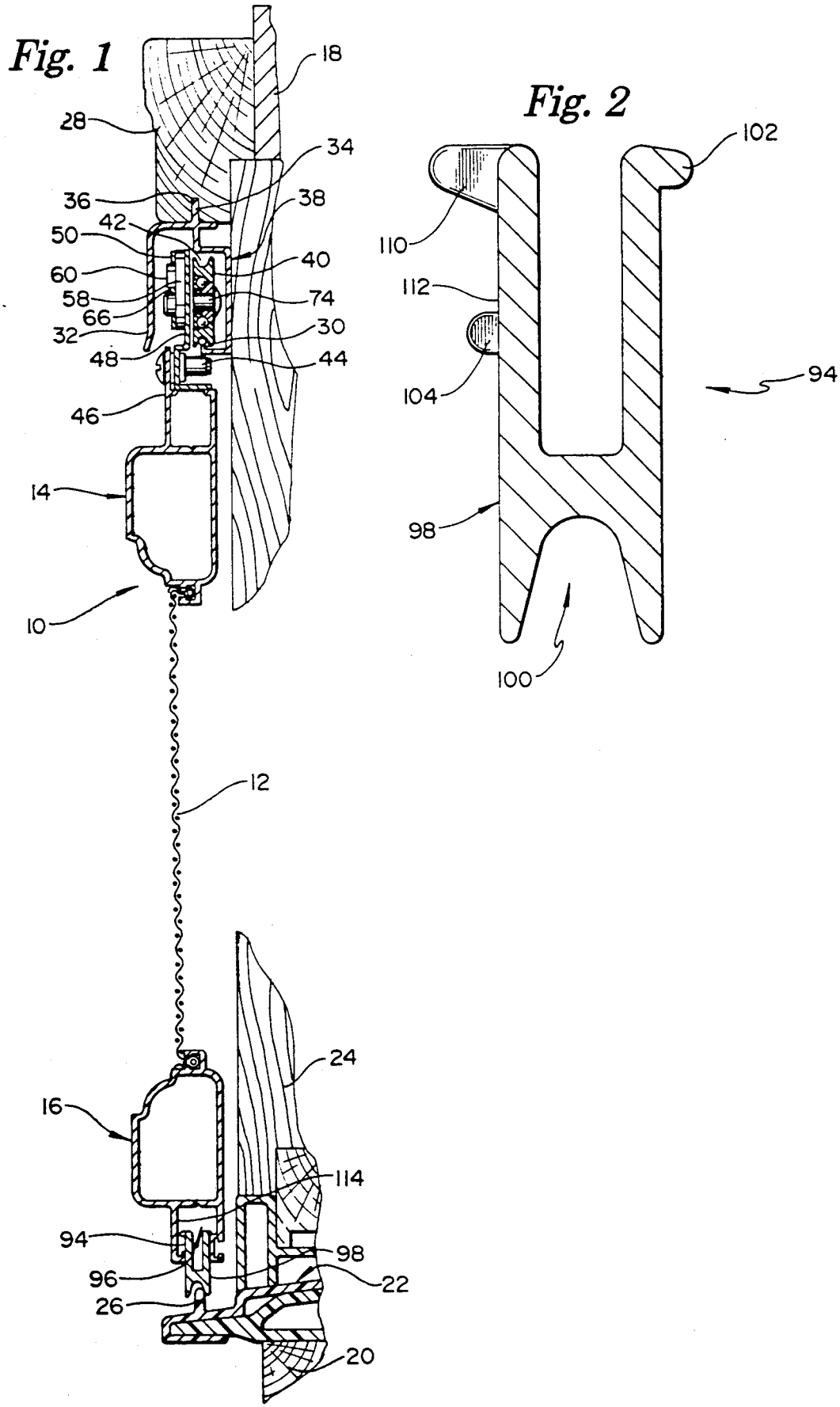

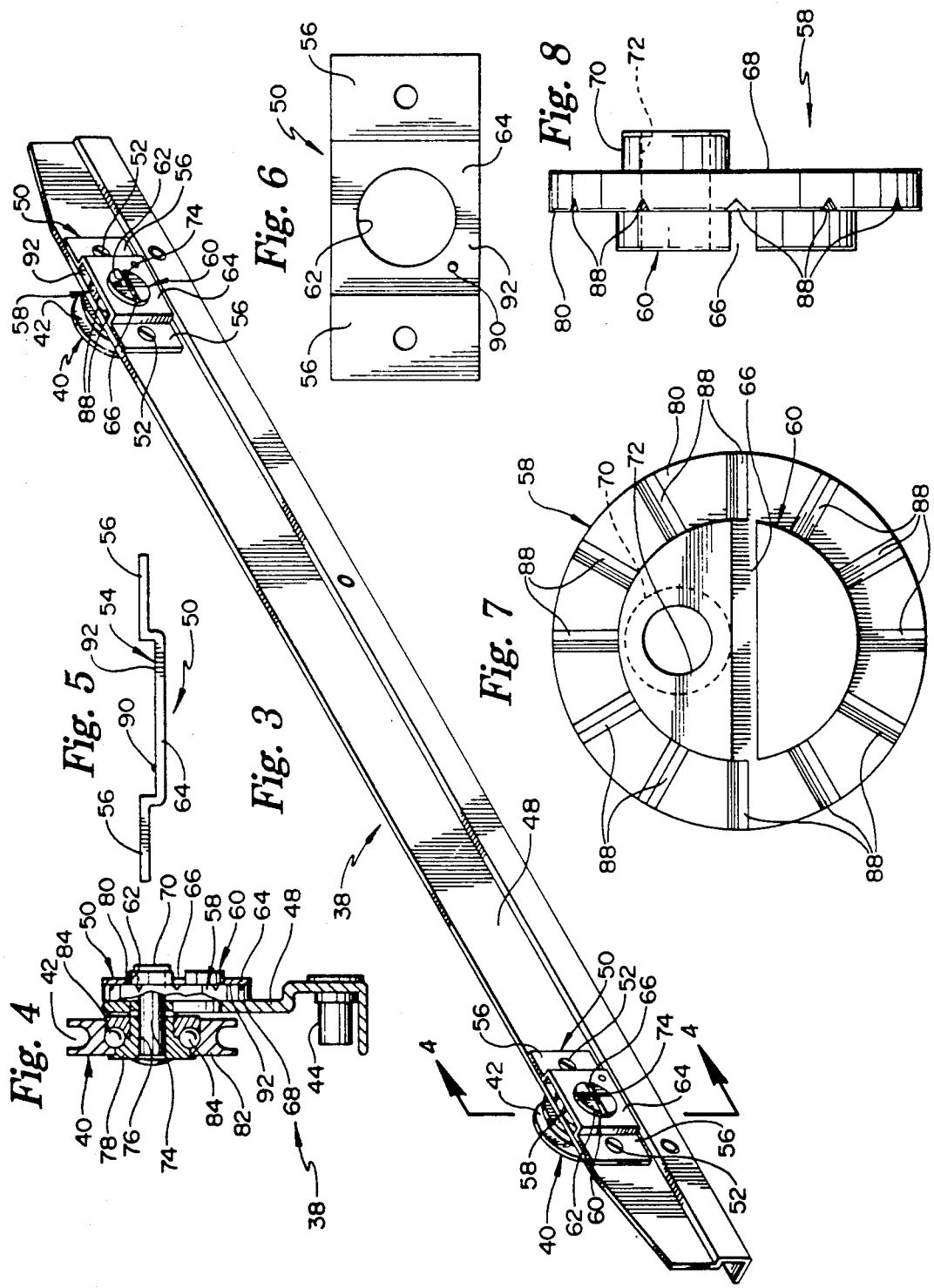

SLIDING DOOR MOUNTING SYSTEM

TECHNICAL FIELD

The present invention deals broadly with the field of doors to provide ingress and egress to and from a building. More specifically, however, the invention is related to a technology for mounting such doors, and, particularly, sliding screen doors, to a track for such movement. The focus of the invention is the provision of means for affording height adjustment of the sliding door relative to the frame within which it is mounted, and positive attachment even when it is jarred or subject to adverse weather conditions.

BACKGROUND OF THE INVENTION

Sliding doors are a technology well-known and relatively well-developed. Typically, such doors, which are known as French doors, are utilized to provide access to patios, decks, etc. from residences with which such patios, decks, etc. are associated.

When sliding doors are provided as a primary closure, typically, sliding screen doors are also provided so that, if the owner of residence desires to enable natural air circulation through the residence in which the door is installed, the primary closure door can be left open with only the fear of insects, etc. being able to enter the residence during periods when a person slides the screen door to an open disposition to enter or exit the building.

Unique problems are presented in the mounting of screen doors and the correlated problem of precluding entrance of insects, etc. around the periphery of the door. For example, while a primary closure door tends to be relatively bulky and very positively mounted to a track along which it slides (in fact, it is typical that primary closure doors are sealed), screen doors, on the other hand, are intended to be easily moved, since it is desirable that they be able to be opened and closed quickly as one enters or leaves the residence. As a result, they tend to be considerably less durable than are primary closure doors. They are lighter in weight and less positively mounted. As a result, consequent problems arise with respect to derailing. Additionally, in the case of some prior art structures, spaces can exist, particularly proximate the bottom end of the door panel, through which mosquitoes, bees, and other biting insects can enter.

It is to the desirable dictates of the prior art and existent problems of the prior art discussed above that the present invention is directed. It is an improved mounting system for sliding door panels, and particularly for sliding screen door panels.

SUMMARY OF THE INVENTION

The present invention is a system for mounting a horizontally sliding door. Typically, such doors, and it is particularly true in the case of sliding screen doors, are mounted to upper and lower tracks. The present invention is intended for mounting with respect to upwardly-extending upper and lower tracks. The invention includes a sliding door panel which has upper and lower rail members. Such members, by definition, extend horizontally. The invention further includes means for mounting the door panel to the upper track for movement along the upper track. Finally, the system includes an elongated element which is suspended from the lower rail. The elongated element is disposed for free, reciprocating vertical movement relative to the lower rail, and the elongated element includes means, proximate its lower end, for effecting interfacing of the elongated element with the lower track.

In the case of many sliding doors known in the prior art (and particularly in the case of sliding screen doors), the lower track can include an elongated rib which defines a generally-vertically oriented plane. The preferred embodiment of the present invention is intended for use with such a lower track. When used with such a track, the elongated element can be formed through an extrusion process to have a slot formed in a bottom surface thereof. In that embodiment, the slot would, typically, extend the full length of the elongated element. The slot, it is intended, would receive the lower track rib therein.

In the preferred embodiment also, the means by which the sliding door panel is mounted to the upper track can include a trolley wheel carried by the upper rail. Trolley wheels as known in the prior art have a groove formed in an outer peripheral surface thereof to receive the upper track therein in order to effect suspension of the door panel from the upper track. Such is true in the present case. In the case of the present invention, however, specific means are provided for varying the vertical location, relative to the upper rail member, at which the trolley wheel is carried. This variation can be accomplished by employing a trolley carriage from which the door panel is suspended. It is intended that the trolley carriage include a wall defining a generally vertically-oriented plane. A disk is carried by the trolley carriage wall and disposed for rotation about an axis. Carrying of the disk can be accomplished by providing the disk with a substantially circular hub received within a similarly shaped and sized aperture formed in a clip secured to the trolley carriage wall. The disk can be sandwiched between the clip and the wall of the carriage.

A first face of the disk is provided with a journal for holding the trolley wheel. The trolley wheel is disposed for rotation about an axis defined by the journal. The journal is off-set from the center of the disk so that, as the disk is rotated by rotating its hub within the aperture in the clip, the journal will be eccentrically moved, and the vertical location of the journal and the trolley wheel carried thereby, relative to the upper rail member, will be varied.

It is intended that the preferred embodiment of the invention include means for maintaining the disk in a desired rotational orientation relative to the trolley carriage wall. In this embodiment, a plurality of circumferentially-spaced recesses would be formed in a second face of the disk (that is, the face of the disk in engagement with the clip. A detent, protruding from a surface of the clip in engagement with the disk, could be positioned so that that detent would be receivable in each of the recesses formed in the face of the disk. As the disk would be rotated, therefore, one or another of the recesses would receive the detent to maintain the disk in the desired rotational orientation, and co-related vertical disposition of the journal and the carried trolley wheel would be accomplished.

The present invention is thus an improved system for mounting a sliding door panel in a frame. More specific features and advantages obtained in view of those features will become apparent with reference to the DE-

3

TAILED DESCRIPTION OF THE INVENTION, appended claims, and accompanying drawings figures.

BRIEF DESCRIPTION OF THE DRAWINGS

FIG. 1 is a side elevational sectional view of the present invention showing a sliding screen door sectioned vertically with some parts cut away and some parts removed for purposes of clarity;

FIG. 2 is an enlarged detail view an elongated element carried by a lower rail member of the door panel;

FIG. 3 is a sub-assembly detail perspective view of portions of the invention;

FIG. 4 is a vertical sectional elevational view taken generally along the line 4—4 of FIG. 3;

FIG. 5 is a bottom plan view showing details of a clip employed in the invention;

FIG. 6 is a rear elevational view of the clip shown in FIG. 5;

FIG. 7 is an enlarged detail view of a disk employed in the invention illustrating a plurality of circumferentially-spaced recesses; and FIG. 8 is a left side elevational view of the disk illustrated in FIG. 7.

DETAILED DESCRIPTION OF THE INVENTION

Referring now to the drawings wherein like reference numerals denote like elements throughout the several views, FIG. 1 illustrates a horizontally-sliding screen door employing a mounting system in accordance with the present invention. The door panel 10 proper is shown as including a wire fabric 12 stretched vertically between upper and lower door panel rails 14, 16. It will be understood that, typically, the door panel 10 would also include a pair of vertically-extending stiles at opposite lateral edges of the wire fabric 12. The figures do not, however, illustrate such stiles, and their presence is not involved in the case of the present invention.

The upper and lower rails 14, 16 are shown as extruded components. Rails are, in the prior art, manufactured in this manner, and, in the case of the present invention, they can be so manufactured. It will be understood, however, that, when extruded, any appropriate material can be used. In fact, the invention encompasses upper and lower rail members 14, 16 which are not extruded and could be manufactured of wood or other appropriate material.

FIG. 1 illustrates upper and lower portions 18, 20 of a wall in which the sliding door 10 is received. A sill structure 22 is illustrated proximate the lower wall portion 20, the sill structure 22 mounting primary closure doors 24 and providing a lower track 26 with which the door panel mounting system of the present invention is associated. The upper wall portion 18 is shown as having, affixed thereto, a header 28 which is shown as receiving an extruded assembly of an upper track 30 and a valance 32. The assembly is mounted to the header 28 by receipt of a tab 34 within a slot 36 within the header 28. Any appropriate securing means is acceptable, however.

FIG. 3 illustrates a trolley carriage 38 by which the door panel 10 is suspended from the upper track 30. As seen in FIG. 1, the upper track 30 is, as is commonly true in the prior art, an upwardly extending rib proximate the lower end of the track/valance assembly. As is true in the prior art also, the present invention includes one or more trolley wheels 40 carried by the carriage 38, each trolley wheel 40 having a groove 42 formed therein for receipt of the upwardly extending track 30.

FIG. 3 illustrates a pair of trolley wheels 40 carried by the trolley 38. While the present invention contemplates the employment of a single wheel 40, in addition to a pair of wheels, and, in some embodiments, the use of three or more wheels, most structures will employ a pair of wheels, since this is most economical, and two point support will preclude swinging.

The trolley carriage 38 has, affixed at its lower end, the door panel 10. Suspension is shown as being affected by passing an appropriate fastener 44 through registered apertures in a hanger flange 46, extending upwardly from the upper rail member 14, and the carriage 38.

The carriage 38 defines, when the door panel 10 is suspended from the upper rail 14, a generally vertically-extending wall 48. The wall is best illustrated in FIG. 3.

A clip 50 is secured to the wall 48 of the trolley carriage 38 at each location where a trolley wheel 40 is intended to be mounted. Affixation of the clip 50 is accomplished in any appropriate manner such as sheet metal screws 52. The clip 50 is formed so as to define a channel 54 of a relatively slight depth between two flange portions 56 employed in effecting attachment of the clip 50 to the carriage wall 48. A disk 58, as best seen in FIGS. 7 and 8 is received within this channel 54, a hub 60 of the disk 58 extending through an aperture 62 formed in the intermediate channel wall 64 of the clip 50. The hub 60 is provided with a slot 66 that is intended to accept a generally planar-tipped tool to effect rotation of the disk 58.

As best seen in FIG. 8, a face 68 of the disk 58, opposite from that from which the hub 60 extends, is provided with an eccentrically-mounted journal 70. The journal 70 is shown as having an aperture 72 formed therethrough and through one of the hub portions on a side of the slot 66 on which the journal 70 is disposed. A rivet axle 74 can be passed through this aperture 72 and an aperture 76 formed in an inner race 78 of the trolley wheel 40. The wheel 40 is, thereby, mounted to the disk 58 in an eccentric fashion.

It will be understood that the face 68 of the disk 58 from which the journal 70 protrudes will be in engagement with the wall 48 of the trolley carriage 38, while the face 80 of the disk 58 from which the hub 60 protrudes will be in engagement with the clip 50. Since the clip 50 is affixed to the trolley carriage wall 48 and the hub 60 maintains the disk 58 in position relative to the clip 50, the disk 58 will be maintained in a desired location relative to the trolley carriage wall 48.

It will be understood also, that an aperture provided in the trolley carriage wall 48 to afford passage to the journal 70 will be sufficiently large so that the disk 58 will be able to be rotated through 360° without the journal 70 being obstructed by the carriage wall 48. The desired vertical positioning of the trolley wheel 40 relative to the trolley carriage wall 48 can, thereby, be effected.

It will be understood by one of skill in the art, that the particular trolley wheel 40 employed can be of a type known in the prior art. Such a trolley wheel 40 is best illustrated in FIG. 4. The inner race 78 is held in a defined position relative to the trolley carriage wall 48 in the manner previously discussed. An outer race 82, separated from the inner race 78 by a plurality of bearings 84 is spaced radially outwardly from the inner race 78 and is configured for rotation relative to the inner race 78 in a manner known in the prior art. An outer surface of the trolley wheel 40 is provided with a groove 42 within which the upper track rib 30 is received.

Typically, it would be desirable to maintain each trolley wheel 40 in an intended vertical position relative to the trolley carriage wall 48. If positive means were not provided, each of the disks 58 might be free to rotate, and the vertical adjustment of the door panel 10 might change when variation was not intended. For this reason then, the face 80 of the disk 58 from which the hub extends is provided with a plurality of circumferentially-spaced recesses 88. FIG. 7 illustrates a disk 58 having a series of twelve circumferentially-spaced recesses 88 formed therein Such a number enables relatively fine-tuning of the vertical adjustment of the trolley wheel 40, but it will be understood that this number will not be exclusive. Similarly, the recesses 88 need not be elongated radially as shown.

It is intended, however, that each recess 88 be able to be registered with a detent 90 extending inwardly from a surface 92 of the clip 50 in engagement with the face 80 of the disk 58 having the recesses 88 formed therein. As seen in FIGS. 5 and 6, the detent 90 is formed at an appropriate location on the surface 92 of the clip 50. By making the recesses 88 in the disk 58 elongated, the inability of a recess 88 to register with the detent 90 will be virtually precluded.

As will be able to be seen in view of this disclosure, the detent 90 will have the effect of maintaining the disk 58 in a particular rotational disposition. Either or both the detent 90 and the disk 58 are made of materials sufficiently deformable so that, upon application of manual rotational force upon the disk 58 by employment of an appropriate tool, the retention will be able to be overcome and the disk 58 rotated to the desired position. The intended position will, as previously discussed, be defined by the registration of another recess 88 with the detent 90.

Trolley wheels 40 carried by the trolley carriage 38 can be adjusted independently of one another. In order to maintain the bottom rail member 16 of the door panel 10 at substantially equal distances from the bottom track 26, however, while the disks 58 will be adjusted independently, they will probably be adjusted so that the trolley carriage 38 is maintained substantially horizontal.

Even intending to maintain the lower rail member 16 of the door panel 10 equidistant from the lower track 26 along its full length, however, minor variations in spacing can arise The invention, therefore, can include an elongated element 94 carried by the lower rail member 16 substantially along its full length. As seen in FIG. 1, the lower rail member 16 is also illustrated as having been extruded. The extrusion illustrated is provided with a downwardly opening channel 96 for receiving a track follower 98. The track follower 98 is free to float on the upper edge of the track 26 and is biased downwardly to a lower position by gravity As best seen in FIG. 2, the follower 98 has, formed in its lower surface, an elongated slot 100 running substantially the length of the elongated element 94. The slot 100, it is intended, receives the lower track 26 therein.

As seen in FIG. 2, the follower 98 is provided with an inner shoulder 102 and an outer shoulder 104. The shoulders 102, 104 are at different heights, since the seats 106, 108 within the channel 96 on which they are intended to be received are at different heights.

FIG. 2 also illustrates a guide protrusion 100 extending outwardly from an outer surface of the follower 98. The guide protrusion 110 is illustrated in FIG. 2 as being at a height substantially the same as that of the inner shoulder 102. The protrusion 110 is given a length substantially the same as the distance between the outer surface 112 of the follower 98 and an inner surface 114 of the wall defining the channel 96. The protrusion 110, thereby, functions to maintain the follower 98 defining a plane substantially parallel to a plane defined by the wire fabric 12 of the screen door panel 10. As will be able to be seen in view of this disclosure, if the location of one or both of the vertical height-adjustment trolley wheels 40 becomes varied from its intended location, the follower 98 would adjust upwardly within the channel 96, and the lower track rib 26 will still maintain contact fully along its length with the slot 100 formed in the elongated element 94. It will be understood that, under some circumstances, the follower 98 might become adjusted to a point at which it is not parallel to the general axis of elongation of the lower rail member 16.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. Apparatus for mounting a horizontally-sliding door in a frame having an upwardly-extending upper track and an upwardly-extending lower track which comprises a horizontally-elongated rib defining a generally vertically-oriented plane, comprising:
   (a) a sliding door panel having upper and lower generally-horizontal rail members;
   (b) means mounting said sliding door panel to the upper track for movement therealong; and
   (c) an elongated element suspended from said lower generally-horizontal rail member for free reciprocating vertical movement relative to said lower generally-horizontal rail member, said elongated element extending substantially the full length of said lower generally-horizontal rail member and comprising an extrusion having a slot formed in, and extending substantially the full length of, a bottom surface of said elongated element, said slot receiving the horizontally-elongated rib comprising the lower track therein.

2. Apparatus in accordance with claim 1 wherein said mounting means comprises:
   (a) a trolley wheel carried by said upper generally-horizontal rail member, said trolley wheel having formed in an outer peripheral surface thereof, a groove in which the upper track is received; and
   (b) means for varying a vertical location, relative to said upper generally-horizontal rail member, at which said trolley wheel is carried.

3. Apparatus in accordance with claim 2 wherein said varying means comprises:
   (a) a trolley carriage suspending the horizontally sliding door, said trolley carriage including a wall defining a generally-vertically oriented plane;
   (b) a disk carried by said trolley carriage wall for rotation about an axis; and (c) means mounting said trolley wheel to said disk at a location on said disk spaced from the center thereof.

4. Apparatus in accordance with claim 3 further comprising means for maintaining said disk in a desired rotational orientation relative to said trolley carriage wall.

5. Apparatus in accordance with claim 4 wherein said disk has opposite faces, a first being held in engagement with said trolley carriage and a second having a plurality of circumferentially-spaced recesses formed therein, said means for maintaining said disk in a desired rotational orientation relative to said trolley carriage wall comprising:

(a) a clip in engagement with said second face of said disk and secured to said trolley carriage wall to hold said disk thereto;

(b) a detent protruding from a surface of said clip in engagement with said disk, said detent receivable in each of said recesses formed in said second face of said disk as said disk is rotated.

6. Apparatus in accordance with claim 5 wherein the lower track comprises a horizontally-elongated rib defining a generally vertically-oriented plane, said elongated element comprising an extrusion having a slot formed in, and extending substantially the full length of, a bottom surface of said elongated element, said slot receiving the horizontally-elongated rib therein.

* * * * *